(12) United States Patent
Bates, III

(10) Patent No.: US 6,213,403 B1
(45) Date of Patent: Apr. 10, 2001

(54) IC CARD WITH FINGERPRINT SENSOR

(75) Inventor: Charles Linsday Bates, III, Laguna Hills, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/393,383

(22) Filed: Sep. 10, 1999

(51) Int. Cl.⁷ .................................................. G06K 19/06
(52) U.S. Cl. ........................... 235/492; 235/486; 235/487
(58) Field of Search ................................... 235/492, 486, 235/487; 361/736, 737

(56) References Cited

U.S. PATENT DOCUMENTS

| | | | |
|---|---|---|---|
| 4,582,985 | 4/1986 | Lofberg | 235/380 |
| 4,600,257 | 7/1986 | Fushimoto | 339/40 |
| 4,780,793 | 10/1988 | Ohtsuki | 361/399 |
| 4,791,608 | 12/1988 | Fushimoto | 365/52 |
| 5,049,728 | 9/1991 | Rovin | 235/492 |
| 5,053,608 | 10/1991 | Senanayake | 235/380 |
| 5,180,901 | 1/1993 | Hiramatsu | 235/380 |
| 5,183,404 | 2/1993 | Aldous et al. | 439/55 |
| 5,191,193 | 3/1993 | Le Roux | 235/379 |
| 5,212,369 | 5/1993 | Karlisch et al. | 235/380 |
| 5,227,612 | 7/1993 | Le Roux | 235/379 |
| 5,239,166 | 8/1993 | Graves | 235/380 |
| 5,296,692 | 3/1994 | Shino | 235/486 |
| 5,334,030 | 8/1994 | Brilliott | 439/75 |
| 5,336,099 | 8/1994 | Aldous et al. | 439/131 |
| 5,338,210 | 8/1994 | Beckham et al. | 439/131 |
| 5,411,405 | 5/1995 | McDaniels et al. | 439/131 |
| 5,430,617 | 7/1995 | Hsu | 361/818 |
| 5,436,621 | 7/1995 | Macko et al. | 340/825.44 |
| 5,463,261 | 10/1995 | Skarda et al. | 307/131 |
| 5,477,418 | 12/1995 | MacGregor et al. | 361/737 |
| 5,505,633 | 4/1996 | Broadbent | 439/329 |
| 5,514,862 * | 5/1996 | Salzano | 235/487 |
| 5,538,442 | 7/1996 | Okada | 439/676 |
| 5,547,401 | 8/1996 | Aldous et al. | 439/676 |
| 5,563,400 | 10/1996 | Le Roux | 235/486 |
| 5,623,552 | 4/1997 | Lane | 382/124 |
| 5,634,802 | 6/1997 | Kerklaan | 439/131 |
| 5,667,395 | 9/1997 | Okada et al. | 439/131 |
| 5,727,972 | 3/1998 | Aldous et al. | 439/655 |
| 5,773,332 | 6/1998 | Glad | 439/344 |
| 5,777,316 * | 7/1998 | Horie et al. | 235/486 |
| 5,801,367 | 9/1998 | Asplund et al. | 235/384 |
| 5,877,488 * | 3/1999 | Klatt et al. | 235/486 |

FOREIGN PATENT DOCUMENTS

| | | |
|---|---|---|
| 0 549 983 B1 | 12/1992 | (EP) . |
| 59-214973 | 12/1984 | (JP) . |
| 63-53687 | 3/1988 | (JP) . |
| 63-313288 | 12/1988 | (JP) . |
| 3-265086 | 3/1990 | (JP) . |
| 2-118790 | 5/1990 | (JP) . |
| 3-141486 | 6/1991 | (JP) . |
| 3-194680 | 8/1991 | (JP) . |
| 11195102 * | 7/1999 | (JP) . |
| WO89/12288 | 6/1989 | (WO) . |

* cited by examiner

Primary Examiner—Michael G. Lee
Assistant Examiner—Uyen-Chau N. Le
(74) Attorney, Agent, or Firm—Roger C. Turner

(57) ABSTRACT

An IC card (10) is provided with a fingerprint sensor (32) that is usually protected from dirt and physical damage but that can be readily deployed while the card lies within a slot (12) of an electronic device (14). The fingerprint sensor is mounted on a tray (30) that can be slid rearwardly (R) out of the rear end of the IC card to a deployed position wherein the fingerprint sensor is exposed, the tray then being slidable forwardly (F) to a stowed position wherein the fingerprint sensor lies within the card housing. A mother board (52) lies within the IC card and one or more connectors (90, 92) are mounted on the mother board. A daughter board (60) fixed to the tray, has pads (72) that engage contacts (96) of the connector on the mother board, when the tray is in its deployed position. The IC card can receive a chip card (140) to authorize access when the fingerprint correspondence is high. A lower sheet metal cover part (48) is cut to form a flap (132) that is bent up to leave an entrance through which the chip card can be inserted.

14 Claims, 4 Drawing Sheets

IC CARD WITH FINGERPRINT SENSOR

BACKGROUND OF THE INVENTION

A user of an electronic device such as a computer connected to the Internet, often must verify his identify. Physical devices such as encryption cards may be lost, while memorized codes such as passwords and PIN numbers may be forgotten. Devices that can read fingerprints enable authentication despite loss or unavailability of encoded cards and despite forgetting of passwords and the like.

A large number of electronic devices have slots constructed for receiving PCMCIA cards (Personal Computer Memory Card International Association). The PCMCIA cards have a front connector with 68 contact positions, a width of 54 mm, and a specified height. The height is 3.3 mm, 5 mm and 10.5 mm for Type I, Type II and Type III cards, with Type II cards being the most common. It would be convenient if authentication of a person's identity through his fingerprint could be communicated to the electronic device through the IC card slot. Since the entire length of an IC card may be received in the slot, a fingerprint sensor has to lie outside the slot. One way is to provide an IC card with a rearward extension that contains a fingerprint sensor. However, the extension and the sensor would be subject to damage as when a piece of equipment hit the extension or if dirt fell onto the sensor. A separate fingerprint sensor could be connected through the I/O connector at the rear end of many IC cards, but this would result in the need to separately store and reconnect the fingerprint sensor. An IC card that facilitated use of a fingerprint sensor while protecting it, would be of value.

SUMMARY OF THE INVENTION

In accordance with one embodiment of the present invention, an IC card is provided for substantially full insertion into an IC card slot of an electronic device, where the IC card holds a fingerprint sensor that can be operated while the IC card lies in the slot and which protects the fingerprint sensor when not in use. A tray is moveably mounted in the IC card to move rearward out of the rear of the card to a deployed position, and which can be moved back into the card to a stowed position, with the fingerprint sensor mounted on the tray.

The IC card includes a mother board with at least one pad connector thereon. The tray includes a daughter board, with the fingerprint sensor mounted on the daughter board and with the daughter board having a row of contact pads. The pads on the daughter board engage contacts on the pad connector when the tray is slid to its deployed position. Such sliding to the deployed position, also closes a switch that supplies electrical power to energize circuitry that processes signals from the fingerprint sensor.

The tray has laterally opposite sides forming guides with upper surfaces that can slide against the top sheet metal cover part and have lower guide surfaces that can slide against an upper surface of the mother board. The guides can be in the form of legs that lie astride the connector(s) on the mother board.

One of the sheet metal cover parts of the IC card housing has a cut forming a flap that allows insertion of a chip card into the IC card. Another connector engages pads on the chip card.

The novel features of the invention are set forth with particularity in the appended claims. The invention will be best understood from the following description when read in conjunction with the accompanying drawings.

DESCRIPTION OF THE PREFERRED EMBODIMENT

Figure 1:
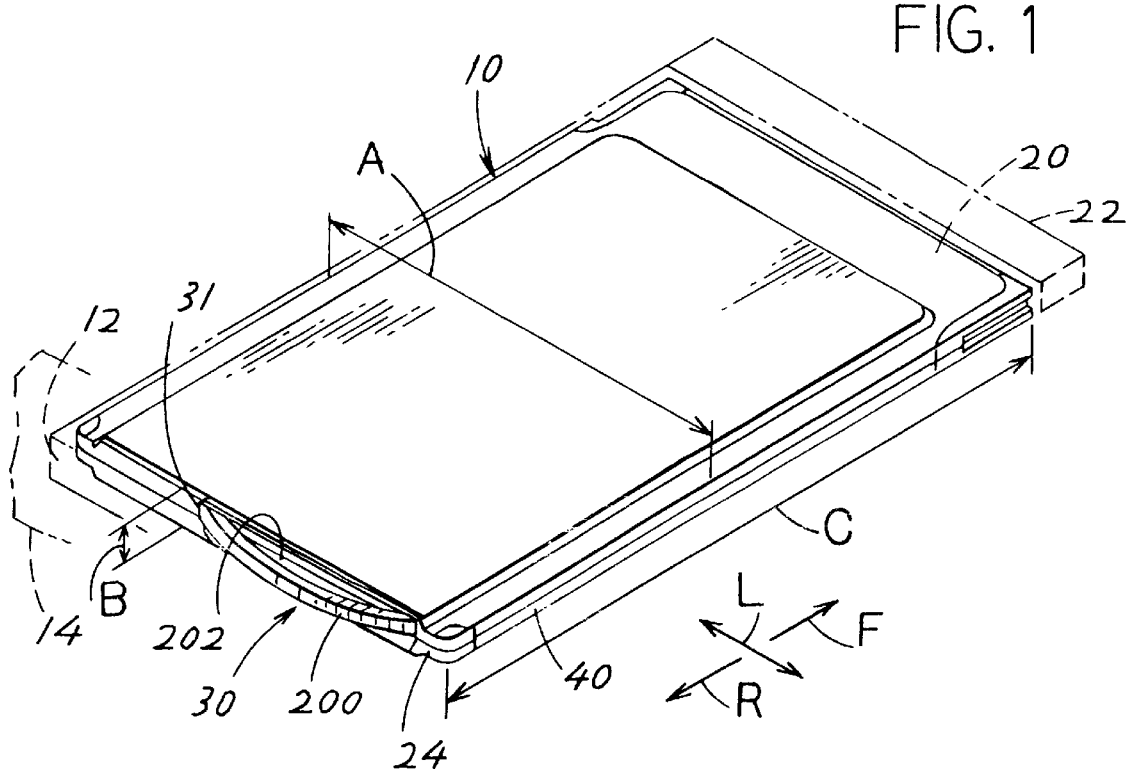
FIG. 1 is a rear and top isometric view of an IC card of the present invention shown in a stowed position, and showing, in phantom lines, an electronic device with an IC card slot into which the IC card has been fully installed.

FIG. 1 illustrates an IC card 10 of the present invention, which is constructed in accordance with PCMCIA standards, to fit into an IC card slot 12 of an electronic device 14 such as a computer. The IC card slot 12 and IC card 10 are constructed in accordance with PCMCIA standards, which specificy a card width A of 54 mm and a card height B for Type II cards of 5 mm. A full-sized IC card has a length C of 85.6 mm, while the full-sized slot 12 has a length of about 91 mm. The IC card 10 is inserted in a forward direction F into the IC card slot, until a front connector 20 of the card engages a device connector 22 at the front end of the slot. When the IC card is fully inserted, a rear end 24 of its housing 40 lies about 4 or 5 mm forward of the rear end of the slot 12, but a tray handle 200 lies slightly forward of the rear end of the slot. The electronic device 14 may have a door that closes the rear of the slot to keep out dirt.

Figure 2:
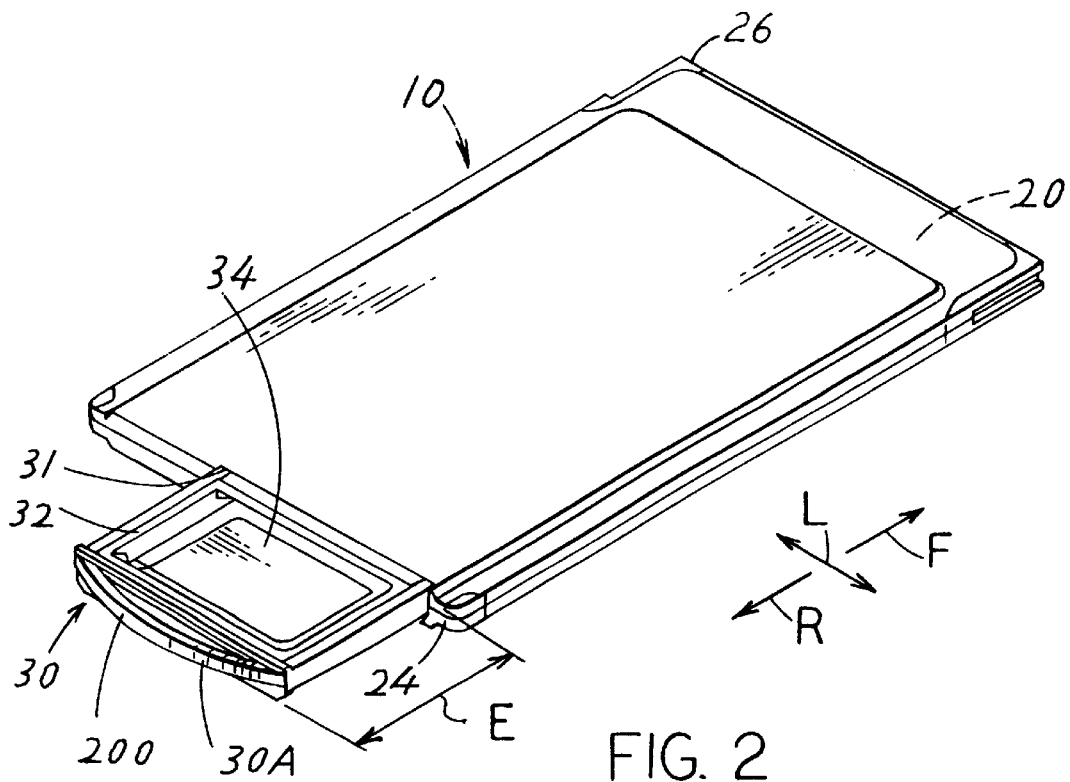
FIG. 2 is a rear and top isometric view of the IC card in FIG. 1, in a deployed configuration.

The IC card 10 is designed to authenticate the identity of a user by sensing the fingerprint of the user. The card has a tray 30 that can slide within a slot 31 forwardly to the stowed position shown at 30 in FIG. 1, and that can slide rearwardly to a deployed position shown at 30A in FIG. 2. In the deployed position, a fingerprint sensor device 32 lying on the rear portion of the tray, has its fingerprint receiver or sensor 34 exposed. A person lays his/her finger on the sensor, which senses the person's fingerprint characteristics. An example of a fingerprint sensor 34 is a matrix of perhaps 200 columns and 200 rows of pixels (total of 40,000 pixels) that each can detect contact with a ridge of a person's fingertip. The IC card delivers signals through its front connector 20 to the electronic device, to indicate whether the identity of the person has been authenticated through sensing of his/her fingertip (or other part of the finger).

Figure 3:
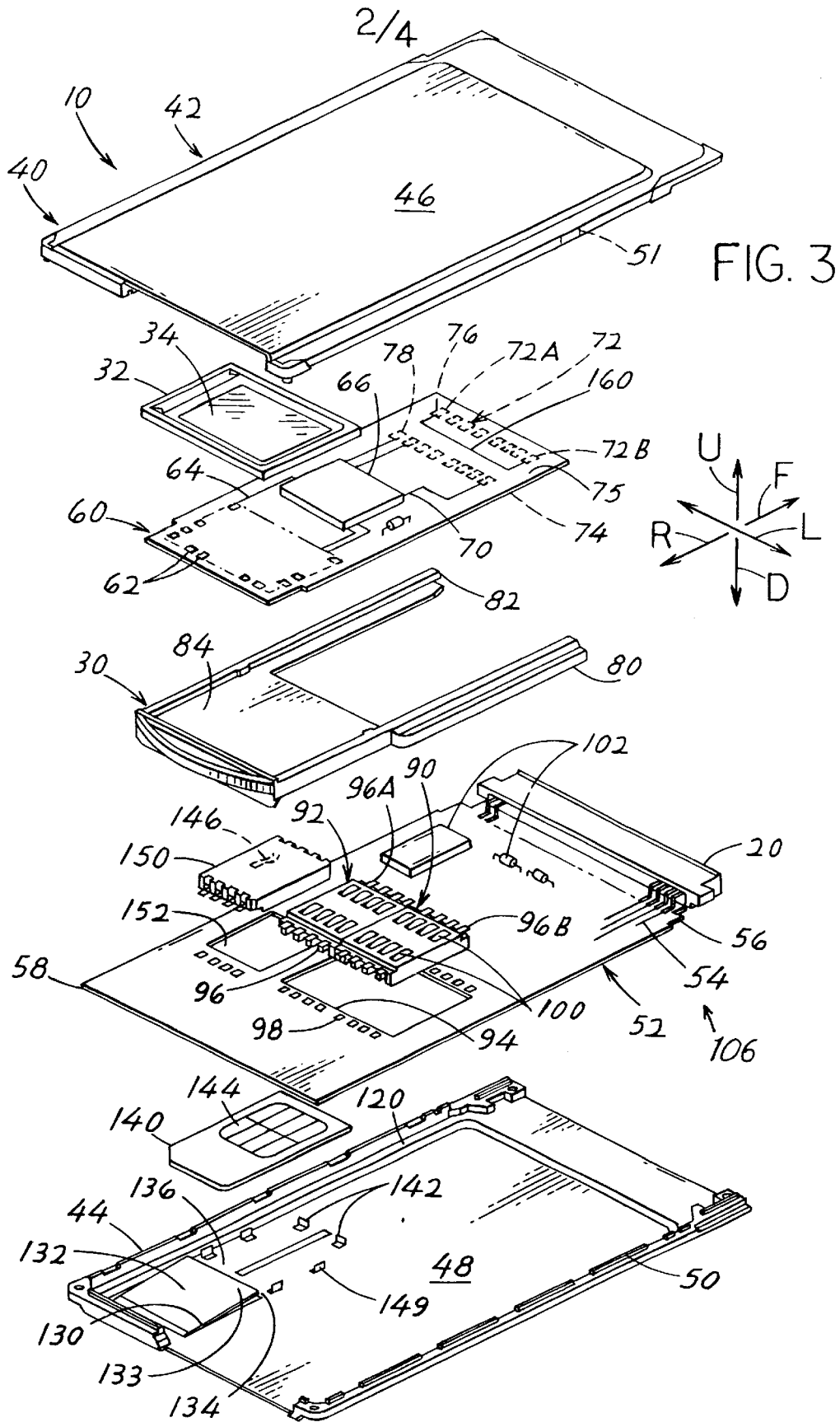
FIG. 3 is an exploded isometric view of the IC card of FIG. 1.

FIG. 3 illustrates details of the IC card. The card includes a card housing 40 formed by top and bottom cover halves 42, 44 spaced in directions U, D. Each cover half includes a sheet metal part 46, 48 and bent sides, and molded-in plastic parts 50, 51 at each of the sides. The cover halves are ultrasonically welded together by welding the plastic pieces of the top and bottom cover halves together. A mother board 52 lies in the space between the top and bottom sheet metal parts 46, 48 and occupies most of the area of the card as seen in a plan view. The mother board has numerous electrically conductive traces 54 for making connections. The mother board has front and rear ends 56, 58, with the front end 56 connected to contacts of the card front connector 20 by connection of tails of the contacts of the connector 20 to selected traces 54.

A daughter board 60 is fixed to the tray 30, with the fingerprint sensor device 32 being mounted on the daughter board. The sensor device has numerous terminals (not shown) on its lower surface, which are soldered to corresponding terminals 62 at the rear of the daughter board. At least one circuit component 66 (IC chip or other component that significantly modifies signals) is preferably mounted on the daughter board. The daughter board has numerous traces 64 that connect the terminals 62 to the circuit component 66, and additional traces 70 that connect the circuit component to contact pads 72. The contact pads 72 lie on a bottom surface 74 of the daughter board (opposite its top surface 75) at its front end. FIG. 3 shows forward and rearward rows 76, 78 of the contact pads on the lower surface of the daughter board. The tray has a pair of guide arms 80, 82 that extend forwardly from laterally L opposite sides of a rear portion 84 of the tray, with the guide arms helping to guide the tray in sliding movement between its stowed and deployed positions. It would be possible to pivotally mount the tray for deployment behind the card housing, but sliding is easier.

A pair of pad connectors 90, 92 are mounted on the mother board, by placing the connectors in a slot 94 in the mother board. Contacts 96 of the pad connectors have terminal ends that are soldered to terminals 98 on the mother board, and have pad-engaging ends 100 that project upward. The contact ends 100 are designed to engage the contact pads 72 on the daughter board, only when the daughter board is in its fully deployed position. Then, electrical power passes into the IC card through the front card connector 20 and signals past out of the IC card through the front connector 20 to the electronic device to authenticate or not authenticate the fingerprint. Circuitry 106 that includes the daughter board 60 and mother board 52, including any circuit components, electronically couples the fingerprint sensor 34 to the front connector 20, al least when the tray is deployed. Currents pass through the mother board 52 and electronic components 102 on the mother board, and through additional traces to the pad connectors 90, 92, and to the contact pads 72 on the daughter board. When the tray 30 is pushed forward F to its stowed position, contact is broken between the pad connectors 90, 92 and the daughter board contact pads 72.

Figure 5:
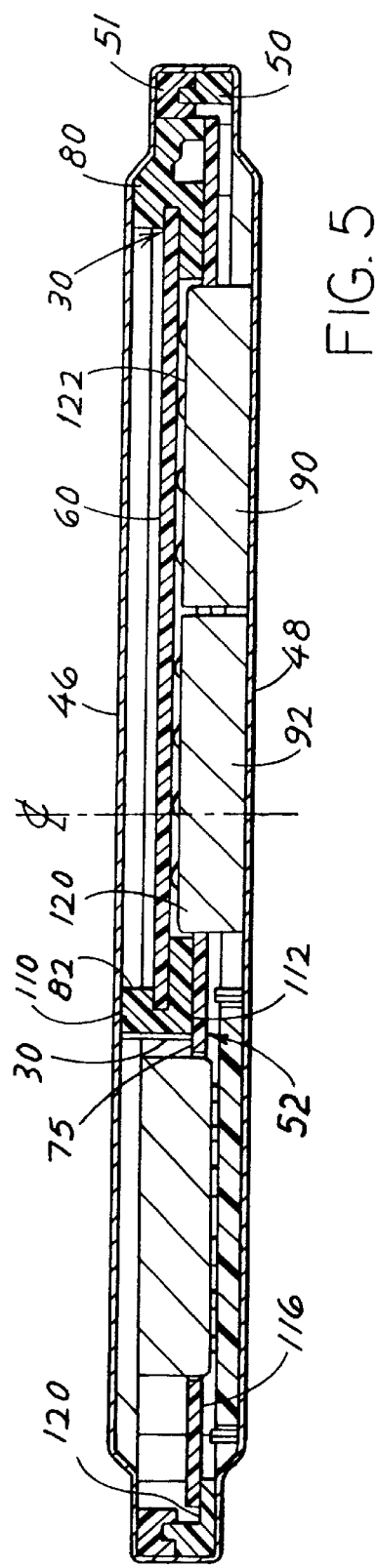
FIG. 5 is a sectional view taken on line 5—5 of FIG. 4.
Figure 6:
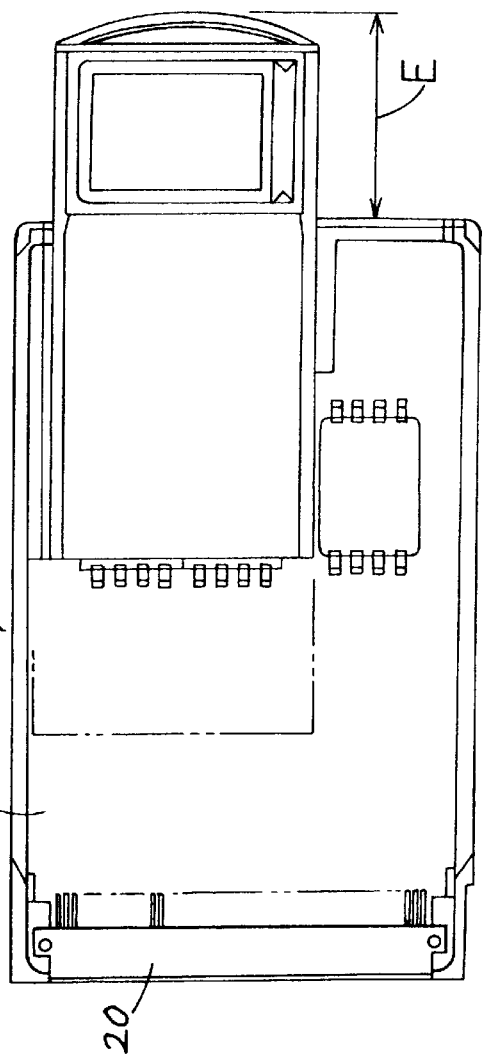
FIG. 6 is a plan view of the IC card of FIG. 4, with the top cover part removed, and with the IC card being in a deployed configuration.
Figure 4:
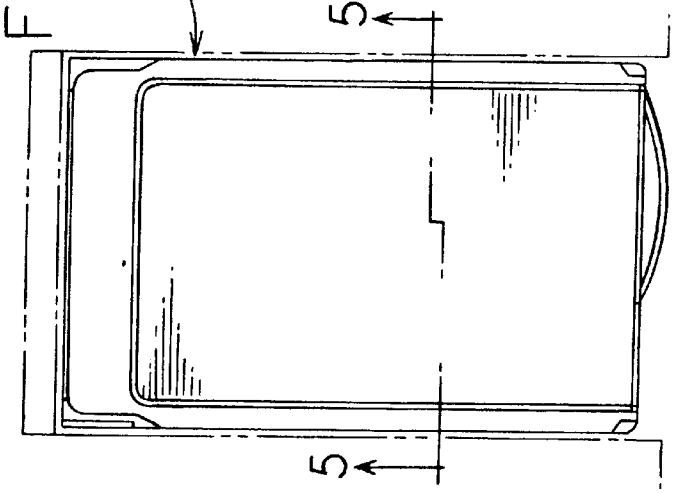
FIG. 4 is a plan view of the IC card of FIG. 1, with the tray shown in its stowed position.

FIG. 5 shows details of the tray 30, showing how the daughter board 60 is supported on the right and left arms 80, 82 of the tray. It can be seen that each arm has an upper tray surface 110 that lies facewise adjacent to the sheet metal top part 46 and a lower tray surface 112 that lies facewise adjacent to the upper surface 75 of the mother board 52. Films of low friction material can lie between tray surfaces and the sheet metal and mother board to lower friction. The mother board also has a lower surface 116 which is supported on a surface 120 of the card housing. Thus, the tray is restricted in vertical movement by the upper sheet metal cover part 46 and by the mother board 52. Each of the guide arms 80, 82 are restricted in sideward movement by projecting parts 120, 122 of the pad connectors 90, 92. The guide arms lie astride the connector frames. It should be noted that the right guide arm 80 is further restricted from rightward/sideward movement by the plastic pieces 50, 51 of the card housing sides.

Figure 7:
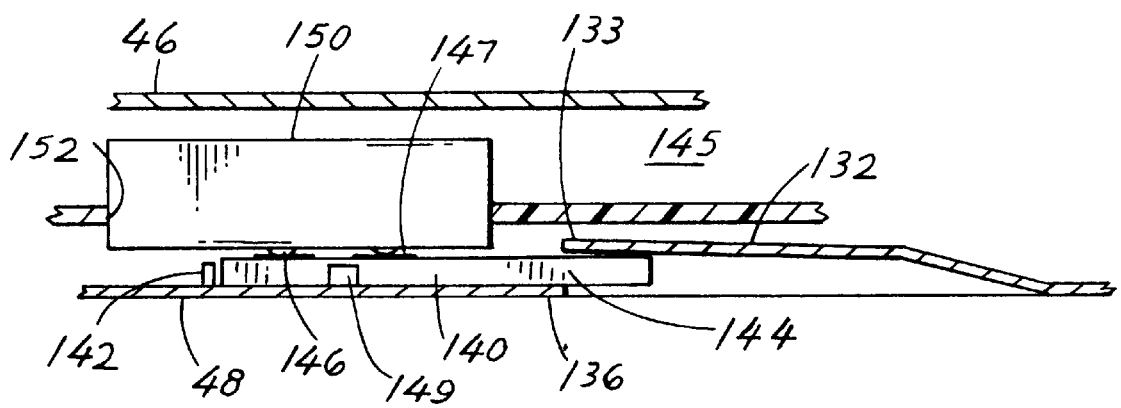
FIG. 7 is a sectional view of a portion of the IC card of FIG. 3, with the chip card fully installed.

FIG. 3 shows that the lower sheet metal part 48 of the housing has a slit 130 forming a flap 132 with sides extending in longitudinal directions F, R and with a free front end 133. The flap is upwardly bent to lie in the space 145 (FIG. 7) between the top and bottom sheet metal parts 46, 48, to form an entrance 144 between the front 133 of the flap and a location 136 immediately forward of the flap. A chip card 140 can be inserted forwardly and at a slight upward incline through the entrance 144, until a front end of the chip card engages a stop 142. Both the stop 142 and slide guides 149 are formed by tabs cut in the sheet metal part 48. In the fully inserted position of the chip card, contact pads 147 on the chip card are engaged by pad-engaging ends 146 of a pad connector 150. It is noted that the pad connector 150 lies in a slot 152 of the mother board, but its pad-engaging contact ends 146 are at the bottom of the pad connector instead of at its top.

The chip card 140 of FIG. 3, which is sometimes referred to as a SIM card, can be installed only when the IC card is out of the slot in the electronic device. The purpose of the chip card is to provide at least partial authentication of the user. A fingerprint of an individual can be identified by detecting the presence and location of a number of deltas (where three fingerprint ridge lines almost come together and form a delta between them) in relation to the core (the center of the fingerprint impression). Other characteristics such as the distance between ridges, etc., can be detected. If only the fingerprint of the person (and the name that he/she types into the computer) are to be used to authenticate the person, then the program which analyzes the output of the fingerprint sensor may require a relatively high correlation of the stored fingerprint characteristics to those detected. However, wear of the person's finger, oil on the sensor, etc., can reduce the number of identifying characteristics that are detected. Applicant constructs the IC card so that if a chip card 140 is present, which contains the proper code identifying a person, then only a minimum number of fingerprint characteristics have to be detected to provide authentification. Also, the presence of the chip may avoid having to type in the person's name. If the chip card is not present, then a greater number of fingerprint characteristics must be detected. Alternatively, low correlation and absence of a chip card may authorize only lower level operation.

Figure 8:
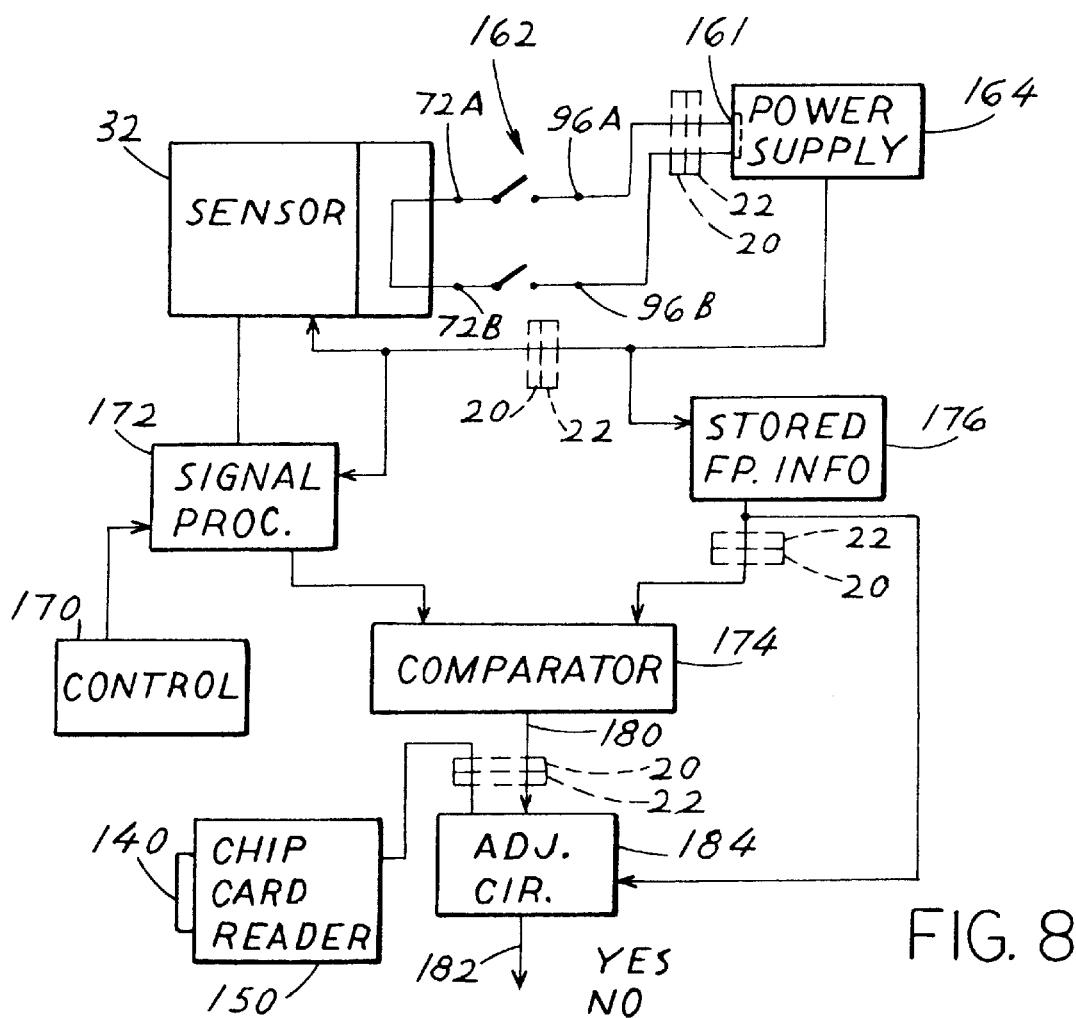
FIG. 8 is a block diagram view of circuitry of the IC card of FIG. 1.

FIG. 3 shows two contacts 96A, 96B of the frontmost row of contacts of the pad connectors. When these contacts 96A, 96B are connected to corresponding pads 72A, 72B on the daughter board, a trace 160 closes a switch. FIG. 8, which is a simplified view of one example of a circuit arrangement of the IC card, shows the pads 72A, 72B and contacts 96A, 96B as a switch 162, that operates a control 161 of a power supply 164. Only when the switch 164 is closed, is electricity supplied from the power supply 164 to the sensor 32 and other circuitry. A control 170 controls a signal processor 172 to process signals from the sensor and deliver them through the daughter board pads and the pad connector to a comparator circuit 174 that is controlled by software. For example, the processor 172 may sense each of 40,000 pixels of the sensor at one microsecond intervals so the entire sensor is scanned in less than $\frac{1}{10}$th second. Stored fingerprint information from a circuit 176 is also fed to the comparator 174, which delivers an output on line 180 that represents the number of characteristics that the sensed fingerprint has in common with the stored fingerprint information in circuit 176. The output on line 180 is delivered to an adjustment circuit 184. If there is no chip card present, then a high degree of fingerprint correlations is required before a yes signal on output line 182 is delivered; a yes signal indicates that the person is authorized to operate the electronic device at the highest level. However, if the chip card 140 is present in the chip card reader 150 formed by the connector 150 and properly identifies the person, then only a lower number of fingerprint correlations is required before the circuit 184 provides a yes. It is preferred that the signal processor 172 be located on the daughter board so it is close to the sensor 32 and many connections are easily made. The comparator 174 and other circuitry can be located on the mother board or in the electronic device that has the slot that receives the IC card. The circuitry requires subcircuits such as amplifiers, filters, etc. The card front connector 20 and the electronic device connector 22 are shown, to indicate what circuitry is preferably in the card and what is in the electronic device for the particular circuit of FIG. 8.

Referring again to FIGS. 1 and 2, it can be seen that the tray 30 has a small handle 200 that projects rearwardly from the rear end 24 of the housing card. The handle 200 projects rearwardly by only 3 mm or 4 mm so it can fit into a slot of an electronic device and a cover can be closed over the slot. The handle has an upwardly-opening recess 202 into which a person can place his/her fingernail to grasp the tray and pull it out. When pulled out (the tray slides by over 10 mm) to the deployed position, the tray projects a distance E of about 24 mm rearward of the rear end 24 of the card housing.

While terms such as "top", "bottom", etc. have been used to describe the IC card as it is illustrated, it should be understood that the IC card can be used in any orientation with respect to the Earth.

Thus, the invention provides an IC card with a sensor such as a fingerprint sensor, that can be used when the card is fully inserted in a slot of an electronic device, and which is protected when not in use. Other sensors (e.g. optical sensor to sense blood vessel pattern in eye, ph sensor, etc.) can be used. The IC card includes a tray that is moveably mounted in the card housing, preferably by sliding, between a forward stowed position wherein the fingerprint sensor lies substantially entirely within the housing of the IC card, so it is protected, and a rearward or deployed position wherein the sensor lies substantially completely rearward of the IC card housing, so it is exposed for sensing a person's fingerprint. In the deployed position, the sensor is electrically coupled to a front connector at the front of the IC card. Such connection is preferably achieved by providing a daughter board on the tray, with traces on the daughter board coupling the sensor (preferably through circuit components) to pads at the rear of the daughter board. One or more pad connectors on the mother board have contacts that engage the pads on the daughter board when the tray is in its rearward deployed position. Contacts on the pad connectors are coupled (possibly through components on the mother board) to contacts on the front connector of the IC card, that mate with contacts of a device connector at the front end of the slot. The IC card can be provided with means for receiving a chip card that helps authenticate the owner. A sheet metal cover of an IC card housing has a flap cut in it, forming an entrance through which the chip card can be inserted until pads on the chip card engage contacts of a connector.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An IC card for forward insertion into an IC card slot of an electronic device, where the IC card can read a person's fingerprint and provide password authorization to the electronic device, including a mother board having top and bottom surfaces and front and rear ends, a front connector coupled to said mother board front end, and a card housing which includes top and bottom cover parts that lie respectively above and below said mother board and that are mechanically connected to said mother board, said card housing having front and rear ends, comprising:

a tray which is moveably mounted in said card housing to move forward and rearward between a stowed position and a deployed position;

a fingerprint sensor mounted on said tray with said fingerprint sensor lying rearward of said card housing rear end in said deployed position of said tray and lying within said card housing in said stowed position of said tray;

a circuit arrangement that electronically couples said fingerprint sensor to said front connector at least when said tray is in said deployed position.

2. The IC card described in claim 1 wherein:

said tray includes a daughter board, with said fingerprint sensor mounted on said daughter board, and with one of said boards having a plurality of contact pads and the other board having at least one pad connector, said pad connector having a plurality of contacts positioned to engage said pads in said deployed position of said tray.

3. The IC card described in claim 1 wherein:

said tray includes a daughter board with top and bottom surfaces, with said fingerprint sensor mounted on said daughter board, and with said daughter board having a plurality of contact pads on its lower surface;

at least one pad connector mounted on said mother board and having a plurality of connector contacts with pad-engaging contact ends positioned to engage said contact pads in said deployed position of said tray.

4. The IC card described in claim 3 wherein:

said daughter board has a plurality of conductive traces and at least one circuit component mounted on said daughter board and coupled through said traces to said fingerprint sensor and to said contact pads.

5. The IC card described in claim 3 wherein:

said electronic device includes an electrical power source and said circuit arrangement includes at least one component that is energized by said power source;

said power source has a control part that is connected to first and second of said connector contacts of said at least one pad connector;

said contact pads on said daughter board include first and second pads that are connected together and that are positioned to engage said first and second connector contacts only in said deployed position of said tray and to disengage said first connector contacts in said stowed position of said tray, whereby said pads on said daughter board of said tray and connector contacts act as an electrical switch.

6. The IC card described in claim 1 wherein:

said tray includes a rear portion with laterally opposite sides, and a pair of guide arms extending forwardly from each of said opposites sides, with each guide arm lying closely between said top cover part and said mother board to be vertically confined between them.

7. An IC card constructed in accordance with PCMCIA standards for forward insertion into a slot of an electronic device that is designed to receive PCMCIA standard IC cards, where the IC card has a housing with front and rear ends and has a front card connector for mating with a device connector in said slot, wherein:

said housing rear end has a slot therein; and including
a fingerprint sensor device with a finger receiver;
a tray, with said fingerprint sensor device mounted on said tray, said tray being slideably mounted in said IC card between a deployed position wherein said fingerprint receiver lies rearward of said housing rear end and a stowed position wherein said fingerprint receiver lies within said housing.

8. The IC card described in claim 7 wherein:

said tray includes a daughter board that has a plurality of contact pads, with said fingerprint sensor device mounted on said daughter board and electrically coupled to said contact pads;

said IC card includes a mother board having a front end coupled to said front connector; and including at least one pad connector mounted on said mother board, with said pad connector having a plurality of pad-engaging contacts positioned to engage said contact pads on said daughter board in said deployed position of said tray.

9. The IC card described in 8 wherein:

said at least one pad connector has a connector frame with a projecting part that projects above said mother board;

said tray has a pair of laterally opposite tray sides and has a leg at each tray side, with said legs lying closely astride said connector frame to allow said connector frame to limit lateral movement of said tray.

10. The IC card described in claim 7 wherein:

said IC card includes a mother board;

said housing includes a cover with a sheet metal upper cover part that lies over said mother board;

said tray has opposite tray sides that each has an upper tray surface lying against said sheet metal upper cover part and a lower tray surface lying against said mother board, to thereby vertically confine said tray.

11. The IC card described in claim 7 wherein:

said housing includes a cover having sheet metal top and bottom parts with a space between said cover parts, with said bottom cover part having a slit that forms a flap with opposite flap sides and a free flap end, with said flap end being bent into said space between cover parts to form an entrance between said flap end and an adjacent location on said bottom cover part that is not bent, to enable a chip card with contacts pads to be inserted through said entrance into said space;

a pad connector lying in said housing and having pad-engaging contacts positioned to engage said pads of said chip card when said chip card is inserted into said space.

12. A method for authenticating the user of an electronic device where the electronic device has a slot for receiving an IC card, where said electronic device has a device connector at a front end of said slot, comprising;

fully inserting an IC card into said slot until a front connector of said IC card mates with said device connector;

with said IC card fully inserted in said slot, pulling a tray rearwardly out of a rear end of a housing of said IC card, from a stowed position of said tray to a deployed position of said tray, where said tray carries a fingerprint sensor which is hidden in said stowed position and which is exposed at a location rearward of said slot in said deployed position;

as said tray reaches said deployed position, electrically coupling contacts of said front connector to said fingerprint sensor.

13. The method described in claim 12 wherein:

said tray includes a daughter board having a plurality of contact pads, and including a mother board fixed in said housing and a pad connector fixed to said mother board, with said pad connector having connector contacts coupled to contacts of said front connector;

said step of pulling a tray rearwardly includes moving said daughter board contact pads into engagement with said connector contacts.

14. An IC card constructed in accordance with PCMCIA standards for forward insertion into a slot of an electronic device that is designed to receive PCMCIA standard IC cards, where the IC card has a housing with front and rear ends and has a front card connector for mating with a device connector in said slot, wherein:

said housing includes a cover having sheet metal top and bottom cover parts with a space between said cover parts, with said bottom cover part having a slit that forms a flap with opposite flap sides and a free flap end, with said free flap end being depressed into said space between cover parts to form an entrance between said flap end and an adjacent location on said bottom cover part that is not depressed, to enable a chip card with contacts pads to be inserted through said entrance into said space;

a pad connector lying in said housing and having pad-engaging contacts positioned to engage said pads of said chip card;

said housing has a rear end with a slot therein;

a fingerprint sensor;

a tray with said fingerprint sensor mounted on said tray, said tray being slideably mounted in said IC card between a deployed position wherein said fingerprint sensor lies rearward of said housing and a stowed position wherein said fingerprint sensor lies substantially completely within said housing;

said fingerprint sensor being electrically coupled to said front card connector.

\* \* \* \* \*